(12) United States Patent
Satran

(10) Patent No.: US 8,696,254 B2
(45) Date of Patent: Apr. 15, 2014

(54) CUTTING INSERT AND CUTTING TOOL THEREFOR

(75) Inventor: Amir Satran, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 408 days.

(21) Appl. No.: 12/332,124

(22) Filed: Dec. 10, 2008

(65) Prior Publication Data

US 2009/0169313 A1 Jul. 2, 2009

(30) Foreign Application Priority Data

Dec. 30, 2007 (IL) .......................................... 188502

(51) Int. Cl.
*B23C 5/20* (2006.01)

(52) U.S. Cl.
USPC ................ 407/34; 407/47; 407/113

(58) Field of Classification Search
USPC ........ 407/34, 40, 41, 42, 47, 113, 114, 115, 2
See application file for complete search history.

(56) References Cited

U.S. PATENT DOCUMENTS

| | | | | | |
|---|---|---|---|---|---|
| 1,853,971 | A | * | 4/1932 | Giern | 408/198 |
| 1,938,717 | A | * | 12/1933 | Oxford | 407/79 |
| 2,102,478 | A | * | 12/1937 | Miller | 407/38 |
| 2,134,140 | A | * | 10/1938 | Miller | 407/45 |
| 3,214,825 | A | * | 11/1965 | Williams | 407/79 |
| 3,629,919 | A | * | 12/1971 | Trevarrow, Jr. | 407/103 |
| 4,209,047 | A | * | 6/1980 | Weill | 144/208.8 |
| 4,437,802 | A | * | 3/1984 | Hall, Jr. | 408/197 |
| 5,810,518 | A | * | 9/1998 | Wiman et al. | 407/102 |
| 5,924,826 | A | * | 7/1999 | Bystrom et al. | 407/103 |

(Continued)

FOREIGN PATENT DOCUMENTS

| | | | |
|---|---|---|---|
| DE | 35 33 125 | 9/1985 | |
| DE | 3446455 A1 | * 6/1986 | ............. B23B 27/16 |
| JP | HEI 04-035803 | 3/1992 | |
| WO | 95/29026 | 2/1995 | |

OTHER PUBLICATIONS

International Search Report in PCT/IL2008/001610, dated Jun. 5, 2009.

(Continued)

*Primary Examiner* — Kenneth E. Peterson
*Assistant Examiner* — Jennifer Swinney
(74) *Attorney, Agent, or Firm* — Womble Carlyle

(57) ABSTRACT

A cutting tool has at least one cutting insert seated therein. The cutting insert has a longitudinal axis, an upper surface, a lower surface and a peripheral surface that extends between the upper surface and the lower surface. At least a portion of an intersection between the upper surface and the peripheral surface constitutes a cutting edge. The lower surface has at least one set of base abutment surfaces, each set including at a least one major base abutment surface and at least one minor base abutment surface, the major and minor base abutment surfaces of a given set being spaced apart from one another along the longitudinal axis. When the lower surface has two such sets of base abutment surfaces, the major and minor base abutment surfaces of the first set are longitudinally displaced from the corresponding major and minor base abutment surfaces of the second set. Furthermore, the major and minor base abutment surfaces of the first set lie on a first base abutment plane while the major and minor base abutment surfaces of the second set lie on a second base abutment plane, the first and second base abutment planes forming a first non-zero angle therebetween.

32 Claims, 8 Drawing Sheets

(56) References Cited

U.S. PATENT DOCUMENTS

| | | | |
|---|---|---|---|
| 5,931,613 A * | 8/1999 | Larsson | 407/103 |
| 5,944,456 A | 8/1999 | Shirley et al. | |
| 6,102,630 A | 8/2000 | Flolo | |
| 6,146,061 A * | 11/2000 | Larsson | 407/103 |
| 6,196,769 B1 | 3/2001 | Satran et al. | |
| 6,203,251 B1 | 3/2001 | Oppelt et al. | |
| 6,244,790 B1 | 6/2001 | Kingdom et al. | |
| 6,840,716 B2 * | 1/2005 | Morgulis et al. | 407/34 |
| 6,929,429 B2 * | 8/2005 | Riviere | 407/113 |
| 6,945,740 B2 * | 9/2005 | Svenningsson et al. | 407/61 |
| 7,001,115 B2 | 2/2006 | Erickson et al. | |
| 7,014,396 B2 * | 3/2006 | Satran et al. | 407/113 |
| 7,387,474 B2 * | 6/2008 | Edler et al. | 407/113 |
| 7,510,352 B2 * | 3/2009 | Craig et al. | 407/107 |
| 7,510,354 B2 * | 3/2009 | Andersson et al. | 407/113 |
| 7,537,419 B2 * | 5/2009 | Sjoberg et al. | 407/103 |
| 7,819,610 B2 | 10/2010 | Wallström et al. | |
| 2003/0017014 A1 | 1/2003 | Morgulis et al. | |
| 2004/0101371 A1 | 5/2004 | Arvidsson et al. | |
| 2005/0117981 A1 | 6/2005 | Satran et al. | |
| 2006/0056926 A1 * | 3/2006 | Riviere et al. | 407/40 |
| 2006/0216121 A1 * | 9/2006 | Edler et al. | 407/104 |

OTHER PUBLICATIONS

Official Action dated May 31, 2013 issued in Korean counterpart application (No. 10-2010-7014369) with translation.

Official Action dated Mar. 22, 2013 issued in Japanese counterpart application (No. 2010-540216) with translation.

* cited by examiner

CUTTING INSERT AND CUTTING TOOL THEREFOR

FIELD OF THE INVENTION

The present invention relates to an indexable cutting insert and to a holder for such a cutting insert.

BACKGROUND OF THE INVENTION

Rotary cutting tools having holders and replaceable cutting inserts clamped therein by a clamping screw are known. When using such a rotary cutting tool at high speeds, however, stability problems arise due to a great magnitude of centrifugal forces created by the high rotational speed at which the rotary cutting tool operates. Moreover, the centrifugal force can cause shearing of the clamping screw. Due to these problems, use of conventional clamping methods is limited and it is unsatisfactory to rely exclusively upon a clamping screw to releasably secure the cutting insert to the holder or to a cassette. Employing external clamps only aggravates the problem, since the added mass of the clamps creates even greater centrifugal forces, making the stability problems even worse. Consequently, tools for high-speed machining require creation of an interlocking connection in order to absorb the greater part of the centrifugal force and decrease the level of stress on the mounting means.

Known interlocking connections are, for example, tongue and groove connections in which the supporting surface of the cutting insert features a rectangular tongue which is engaged with a corresponding groove of the receiving surface of the main body of the tool. Such a clamping arrangement is shown in U.S. Pat. No. 5,944,456; U.S. Pat. No. 6,203,251; U.S. Pat. No. 5,924,826 or WO 95/29026.

However, this type of construction leads to very high levels of stress on the main body of the tool, especially, in the base region of the groove due to the notch effect.

Mating serrated surfaces are another known clamping arrangement. DE Patent Application No. 35 33 125 A; U.S. Pat. No. 6,244,790; U.S. Pat. No. 6,102,630 or US 2004/0101371 disclose mating supporting surfaces of an indexable insert and a receiving surface of a tool featuring serrations in mutual engagement.

However, such a clamping arrangement may create over-constrained clamping, which may cause equivocal positioning of the indexable insert in the tool body.

U.S. Pat. No. 6,196,769 discloses a rotary cutting tool for high-speed machining having a cutting insert interchangeably mounted in a tool body. At least parts of a supporting surface of the cutting insert and of a receiving surface of the tool body are of a V-shaped configuration and are engaged with each other, when viewed in a cross section perpendicular to an axis of rotation of the rotary cutting tool. In order to radially support the cutting insert, a bearing surface on the tool body is arranged in such a way that a mounted cutting insert is tilted such that the supporting surface of the tool body and the receiving surface of the cutting insert come into mutual contact at only two points.

SUMMARY OF THE INVENTION

In accordance with the present invention there is provided a cutting insert having a longitudinal axis and comprising an upper surface, a lower surface, and a peripheral surface extending between the upper surface and the lower surface, at least a portion of an intersection between the upper surface and the peripheral surface constituting a cutting edge; wherein the lower surface comprises at least two base abutment surfaces longitudinally displaced from each other and defining a first non-zero angle therebetween.

Advantageously, the base abutment surfaces are ground.

According to a preferred embodiment of the present invention, the cutting insert is indexable.

Typically, the first non-zero angle is in the range of about 70° to 150°, preferably in the range of about 115° to 145°, more preferably in the range of about 125° to 135° and most preferably about 130°.

At least one of the base abutment surfaces constitutes a major base abutment surface, the peripheral surface comprises at least a side abutment surface that forms a second non-zero angle with the major base abutment surface, the second non-zero angle is in the range of about 40° to 80°, preferably in the range of about 60° to 80°, more preferably in the range of about 65° to 75° and most preferably about 70°.

Advantageously, the side abutment surface is ground.

Typically, the cutting insert has a through bore that extends between the upper surface and the lower surface.

Further typically, the peripheral surface further comprises an end abutment surface, the end abutment surface is generally perpendicular to the side abutment surface.

Advantageously, the end abutment surface is ground.

Further advantageously, the major base abutment surface is associated with a minor base abutment surface, and wherein the major base abutment surface and the associated minor base abutment surface lie on a same base abutment plane.

Preferably, the cutting insert has a 180° rotational symmetry around an axis of symmetry of the cutting insert, the axis of symmetry extends between the upper surface and the lower surface of the cutting insert and perpendicularly to a reference plane that passes through lowermost extreme points of the lower surface, as seen in an end view of the cutting insert.

Typically, a first major base abutment surface is separated from its associated first minor base abutment surface by a second major base abutment surface.

Further in accordance with the present invention there is provided a cutting tool comprising a tool holder and at least one cutting insert mounted therein and clamped by a clamping screw;

the cutting insert having a longitudinal axis and comprising an upper surface, a lower surface, and a peripheral surface extending between the upper surface and the lower surface, at least a portion of an intersection between the upper surface and the peripheral surface constitutes a cutting edge, a through bore extends between the upper surface and the lower surface, the lower surface comprises a first and a second major base abutment surfaces longitudinally displaced from each other and defining a first non-zero angle therebetween, each of the major base abutment surfaces is associated with a pair of side surfaces that join each other at a remote end from the associated major base abutment surface. Each pair of side surfaces comprises a side abutment surface and an end abutment surface, the side abutment surface is located adjacent a lower portion of the associated major base abutment surface, and the end abutment surface is located remote from the associated major base abutment surface;

the tool holder has a longitudinal axis and comprises at least one pocket, having a threaded pocket bore, for retaining the cutting insert, the at least one pocket comprises:

a generally radially directed side support surface, a generally axially directed end support surface, and an inclined base support surface transversely directed to the side support surface and to the end support surface, the inclined base support surface is provided with a base recess located generally in a radially outermost center region of the inclined base support surface;

when the cutting insert is mounted in the pocket and retained by the clamping screw that passes through the through bore and threadingly engages the threaded pocket bore, operative abutment surfaces of the cutting insert abut the pocket in the following manner:

a given major base abutment surface of the cutting insert abuts the inclined base support surface of the pocket, a given side abutment surface of the cutting insert abuts the side support surface of the pocket, a given end abutment surface of the cutting insert abuts the end support surface of the pocket, and a given non-operative major base abutment surface of the cutting insert is located within the base recess of the pocket in a non-abutted manner.

Still further in accordance with the present invention there is provided a cutting insert having a longitudinal axis and comprising an upper surface, a lower surface and a peripheral surface extending between the upper surface and the lower surface, at least a portion of an intersection between the upper surface and the peripheral surface constitutes a cutting edge; wherein the peripheral surface has a side abutment surface that extends generally parallel to the longitudinal axis, and an end abutment surface that extends generally perpendicular to the longitudinal axis and joins the side abutment surface, the lower surface has a major base abutment surface, the side abutment surface is located adjacent a lower portion of the major base abutment surface, the end abutment surface is located remote from the major base abutment surface, and the major base abutment surface forms a second non-zero angle with the side abutment surface.

Typically, the second non-zero angle is in the range of about 40° to 80°, preferably in the range of about 60° to 80°, more preferably in the range of about 65° to 75° and most preferably about 70°.

Further typically, the cutting insert further comprises a through bore that extends from the upper surface to the lower surface.

Advantageously, the major base abutment surface is associated with a minor base abutment surface located remote from the major base abutment surface, and wherein the major base abutment surface and the associated minor base abutment surface lie on a base abutment plane.

Still yet further in accordance with the present invention there is provided a cutting tool comprising a tool holder and at least one cutting insert mounted therein and clamped by a clamping screw;

the cutting insert having a longitudinal axis and comprising an upper surface, a lower surface and a peripheral surface extending between the upper surface and the lower surface, at least a portion of an intersection between the upper surface and the peripheral surface constituting a cutting edge, a through bore extends between the upper surface and the lower surface, the peripheral surface has a side abutment surface that extends generally parallel to the longitudinal axis, and an end abutment surface that extends generally perpendicular to the longitudinal axis and joins the side abutment surface, the lower surface has a major base abutment surface, the side abutment surface is located adjacent a lower portion of the major base abutment surface, and the end abutment surface is located remote from the major base abutment surface;

the tool holder has a longitudinal axis and comprises at least one pocket, having a threaded pocket bore, for retaining the cutting insert, the pocket comprising:

a generally radially directed side support surface, a generally axially directed end support surface, and an inclined base support surface transversely directed to the side support surface and to the end support surface, the inclined base support surface is provided with a base recess located generally in a radially outermost center region of the inclined base support surface;

when the cutting insert is mounted in the pocket and retained by the clamping screw that passes through the through bore and threadingly engages the threaded pocket bore, operative abutment surfaces of the cutting insert abut the pocket in the following manner:

the major base abutment surface of the cutting insert abuts the inclined base support surface of the pocket, the side abutment surface of the cutting insert abuts the side support surface of the pocket, and the end abutment surface of the cutting insert abuts the end support surface of the pocket.

Advantageously, the cutting insert further comprises a minor base abutment surface located remote from the major base abutment surface, the minor base abutment surface and the major base abutment surface lie on a base abutment plane, and wherein when the cutting insert is mounted in the pocket and retained by the clamping screw, the major base abutment surface and the minor base abutment surface lie on opposite ends of the base recess of the pocket and abut the inclined base support surface of the pocket.

Further advantageously, the minor base abutment surface is ground.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
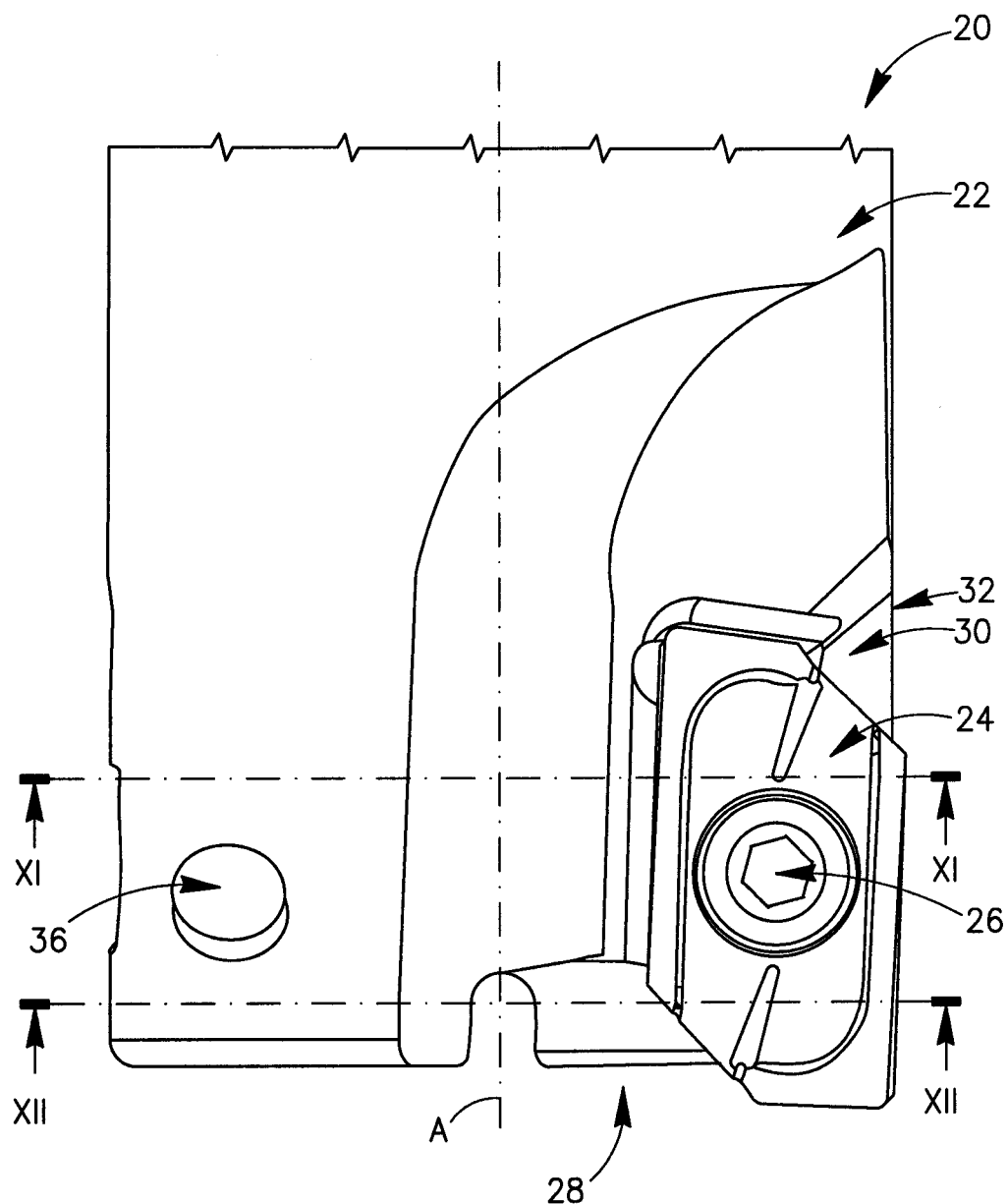
FIG. 1 is a side view of a cutting tool comprising a cutting insert and a tool holder in accordance with a first embodiment of the present invention.

Attention is first drawn to FIGS. 1 to 12 showing a cutting tool 20 with a longitudinal axis A defining a front-to-rear direction and a direction of rotation R. The cutting tool 20 comprises a tool holder 22, two cutting inserts 24 and two clamping screws 26 in accordance with a first embodiment of the present invention. The tool holder 22 has a front cutting portion 28. The front cutting portion 28 of the tool holder 22 has two pockets 30 formed at a perimeter 32 of the tool holder 22. However, other embodiments of the invention may have one, three or more pockets 30. Each of the pockets 30 opens tangentially forwardly and radially outwardly toward the perimeter 32. Since the two pockets 30 are identical, only one of them will be described.

A given cutting insert 24 is removably secured in the pocket 30 of the tool holder 22 by means of a clamping screw 26. The cutting insert 24 has a general shape of a hexagonal prism as seen in a top view and a bottom view of the cutting insert 24. In other embodiments, the cutting insert may have other configurations such as, for example, a parallelogram prism. Furthermore, in other embodiments of the present invention, the cutting insert may be replaced by a cartridge or cassette fitted, releasably or non-releasably, with a blade or an insert. The clamping screw 26 may be any screw known in the art. In a clamping position, the clamping screw 26 passes through a through bore 34 of the cutting insert 24, and threadingly engages a threaded pocket bore 36 in the pocket 30 of the tool holder 22.

It will be understood by a person skilled in the art that the cutting insert 24 may be clamped by other methods known in the art, for example, by a clamp, in which case the cutting insert will not be provided with a through bore 34, and accordingly, the pocket 30 of the tool holder 22 will not be provided with a threaded pocket bore 36.

The cutting tool 20 is optionally a rotary cutting tool particularly for milling, preferably for high-speed milling and further preferably for very high speed milling with rotational speeds in the range of about 50,000 to 60,000 rpm.

Figure 2:
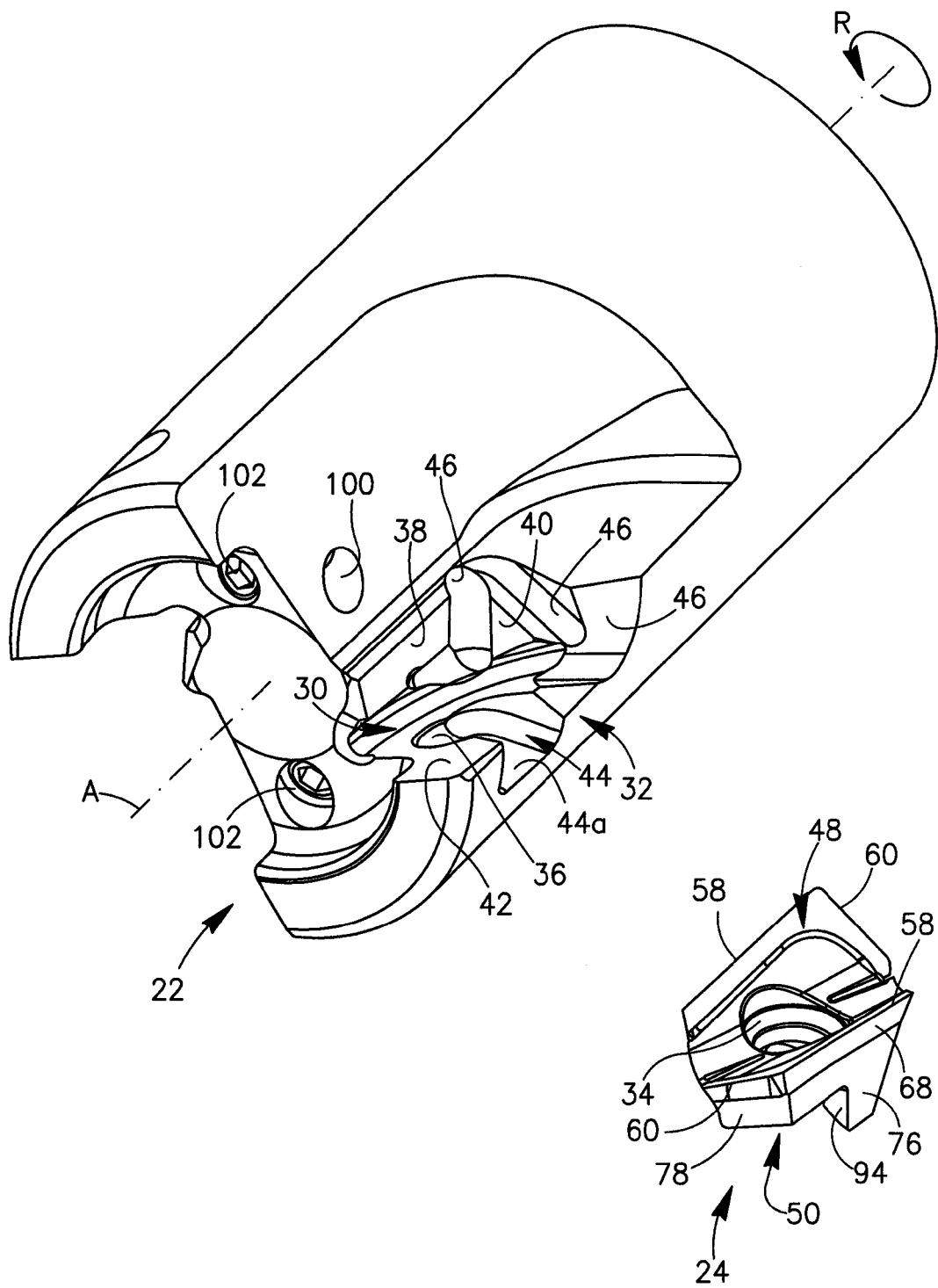
FIG. 2 is an exploded perspective view of the cutting insert and a pocket of the tool holder shown in FIG. 1.

FIG. 2 shows a perspective disassembled view of the tool holder 22 with the pocket 30 for the cutting insert 24 and for the clamping screw 26. The pocket 30 has a generally radially directed side support surface 38, a generally axially directed end support surface 40, and an inclined base support surface 42 for abutting respective surfaces of the cutting insert 24 as will be described below. The base support surface 42 is inclined in the sense that it does not form a right angle with respect to the side support surface 38, as seen in an end view of the tool holder 22. Furthermore, the pocket 30 has a base recess 44 and other pocket recesses 46 to eliminate unwanted areas of contact between the tool holder 22 and the cutting insert 24.

The cutting insert 24 comprises three pairs of surfaces, the surfaces of each pair being located on opposite sides of the cutting insert 24. A first pair comprises an upper surface 48 and a lower surface 50. The cutting insert 24 is single-sided, or non-reversible, in the sense that the upper surface and the lower surface are dissimilar. A second pair comprises two identical end surfaces 52, and a third pair comprises two identical side surfaces 54. The end surfaces 52 and the side surfaces 54 constitute a peripheral surface 56 of the cutting insert 24, and they extend between the upper surface 48 and the lower surface 50. A longitudinal axis L bisects the cutting insert 24 between the two side surfaces 54. As best seen in the top view of FIG. 5, the cutting insert 24 has a pair of long sides defined by the side surfaces 54 and a pair of short sides defined by the end surfaces 52 which extend transversely to the side surfaces 54. According to a first embodiment of the invention, the cutting insert 24 is indexable.

Identical main cutting edges 58 are formed at the intersection of the upper surface 48 with each of the side surfaces 54. Identical auxiliary cutting edges 60 are formed at the intersection of the upper surface 48 with each of the end surfaces 52. Each of the main cutting edges 58 joins an adjacent auxiliary cutting edge 60 through a corner cutting edge 62. Each of the main cutting edges 58, auxiliary cutting edges 60 and corner cutting edges 62 may further comprise a land surface, as it is known in the art. Each of the main cutting edges 58, adjacent auxiliary cutting edge 60 and corner cutting edge 62 therebetween form a cutting portion 64.

Each of the main cutting edges 58 has a rake surface 66 associated therewith in the upper surface 48 and a relief surface 68 associated therewith in the side surface 54. Similarly, each of the auxiliary cutting edges 60 has a rake surface 70 associated therewith in the upper surface 48 and a relief surface 72 associated therewith in the end surface 52.

Figure 5:
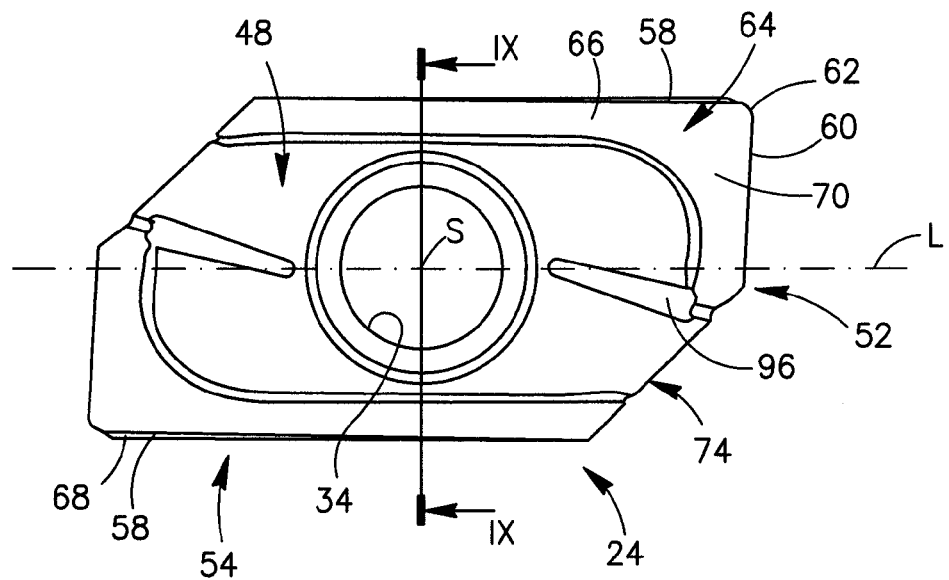
FIG. 5 is a top view of the cutting insert shown in FIG. 2.
Figure 6:
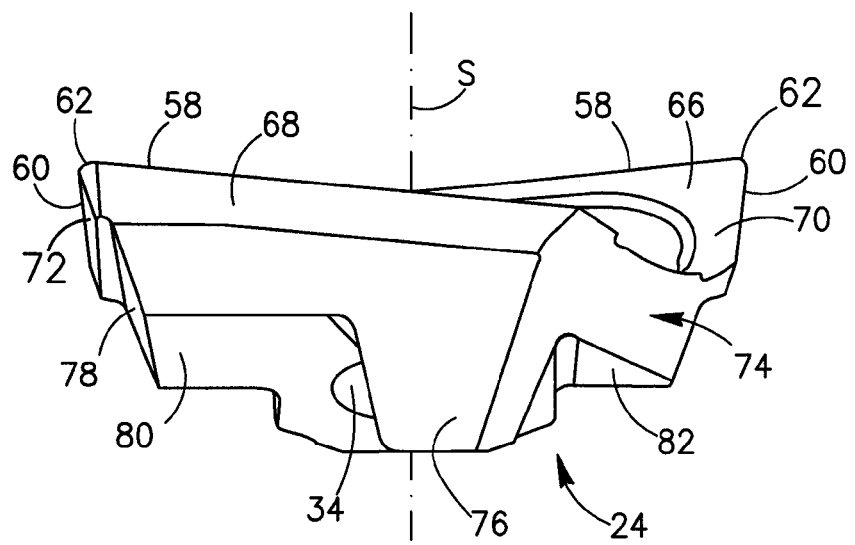
FIG. 6 is a side view of the cutting insert shown in FIG. 2.
Figure 7:
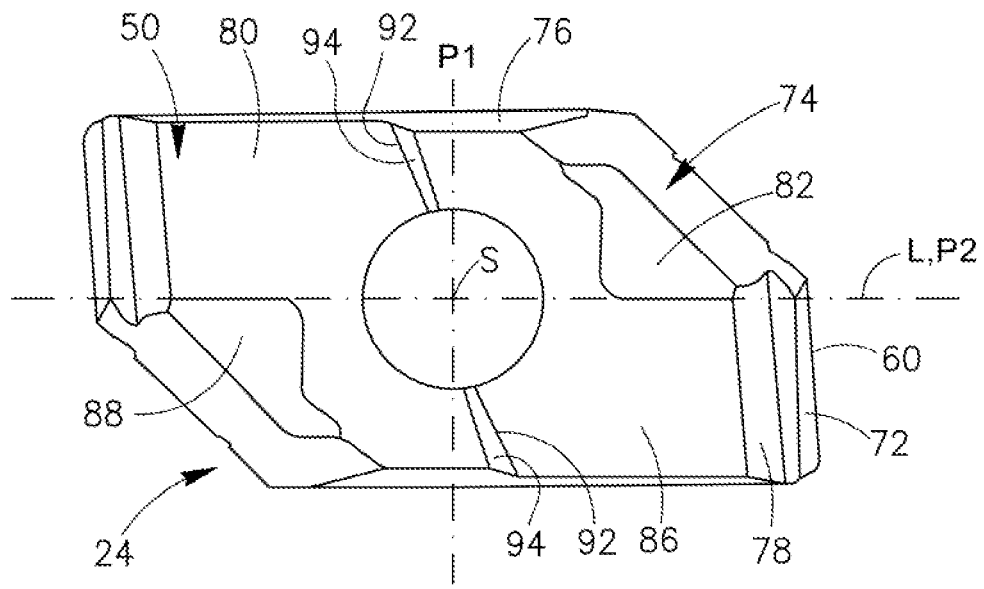
FIG. 7 is a bottom view of the cutting insert shown in FIG. 2.
Figure 8:
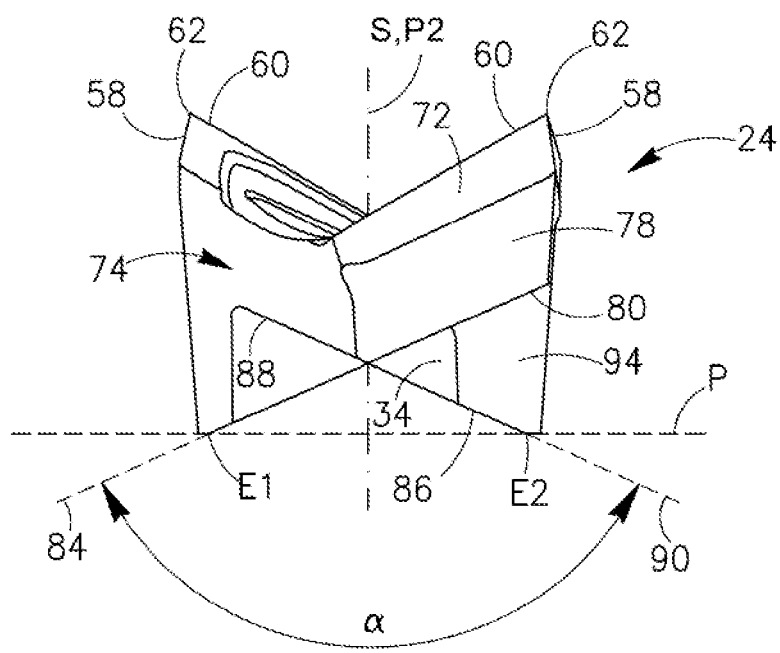
FIG. 8 is an end view of the cutting insert shown in FIG. 2.

The cutting insert 24 has an axis of symmetry S that extends between the upper surface 48 and the lower surface 50 of the cutting insert 24 perpendicularly to the longitudinal axis L, and perpendicularly to a reference plane P that passes through lowermost extreme points E1, E2 of the lower surface 50, as seen in FIG. 8. The cutting insert 24 preferably has 180° rotational symmetry around the axis of symmetry S. As best seen in FIGS. 5 and 7, a cut-out 74 is formed at opposite corners of the cutting insert 24 that are distal the corner cutting edges 62.

The cutting insert 24 has a side abutment surface 76 located on each side surface 54. The side abutment surface 76 extends generally parallel to the longitudinal axis L of the cutting insert 24. The side abutment surface 76 is intended to abut the side support surface 38 of the pocket 30 shown in FIGS. 2 and 10. Preferably, the side abutment surface 76 is ground.

The cutting insert 24 has an end abutment surface 78 that is located on each end surface 52. The end abutment surface 78 is crossed by the longitudinal axis L, and is adjacent and transversely directed to the side abutment surface 76. The end abutment surface 78 is intended to abut the end support surface 40 of the pocket 30. The end abutment surface 78 is preferably ground, and optionally extends generally perpendicular to the longitudinal axis L of the cutting insert 24.

At a given indexing position, only one side abutment surface 76 abuts the side support surface 38 of the pocket 30 and only one end abutment surface 78 abuts the end support surface 40 of the pocket 30 when the cutting insert 24 is retained in the pocket 30.

The lower surface 50 of the cutting insert 24 is provided with a first set of spaced apart base abutment surfaces. The first set includes a first major base abutment surface 80 and at least one associated first minor base abutment surface 82. Both the first major base abutment surface 80 and the first minor base abutment surface 82 lie in a common first base abutment plane 84 and thus are co-planar. Moreover, co-planar base abutment surfaces 80, 82 are configured and dimensioned to abut the inclined base support surface 42 of the pocket 30, when the cutting insert 24 is seated in the pocket 30.

The design of the first major base abutment surface 80 and the associated first minor base abutment surface 82 is such that it ensures firm and stable abutment of the lower surface 50 of the cutting insert 24 against the inclined base support surface 42 of the pocket 30. This is achieved by selecting three spaced apart abutment points (not shown) that are located either on the first major base abutment surface 80 or on the first minor base abutment surface 82. The three abutment points are the vertexes of an imaginary triangle. The axis S of 180° rotational symmetry of the cutting insert 24, which is also the axis of the through bore 34, passes through the imaginary triangle.

The lower surface 50 of cutting insert 24, is also provided with a second set of spaced apart base abutment surfaces. This second set includes a second major base abutment surface 86 and an associated second minor base abutment surface 88 which are co-planar and lie in a common second base abutment plane 90. As best seen in FIG. 7, the first major base abutment surface 80 and the second major base abutment surface 86 are longitudinally displaced relative to one another in the sense that the first major base abutment surface 80 is principally found on a first side of a plane P1 which is perpendicular to the longitudinal axis L and contains the axis of symmetry S, while the second major base abutment surface 86 is principally found on a second, opposite side of plane P1. As seen in FIG. 8, in the end view of the cutting insert 24, the first and second base abutment planes 84, 90 are symmetric about a longitudinal plane P2 defined by the intersection of the axis of symmetry S and the longitudinal axis L. The major base abutment surfaces 80, 86 lie in different planes 84, 90, respectively, and so are non-coplanar. Similarly the minor abutment surfaces 82, 88 are non-coplanar, as well.

In one embodiment, the first major base abutment surface 80, the first minor base abutment surface 82, the second major base abutment surface 86, and the second minor base abutment surface 88 are ground.

The base recess 44 of the pocket 30 prevents the first base abutment plane 84 and the second base abutment plane 90 from concurrently abutting the pocket 30 of the tool holder 22. Thus, when the cutting insert 24 is seated in the pocket 30 with the first set of base abutment surfaces 80, 82 (lying on first base abutment plane 84) abutting the inclined base support surface 42, at least a portion of the second major base abutment surface 86 (lying on second base abutment plane 90) is received into the base recess 44 in a non-abutted manner, i.e., without abutting the base 44a or any other portion of the base recess 44. The first base abutment plane 84, or the second base abutment plane 90, and the side abutment surface 76 which concurrently abut the pocket 30 when the cutting insert is removably secured in the tool holder 22 will hereinafter be referred to as "associated".

Figure 13:
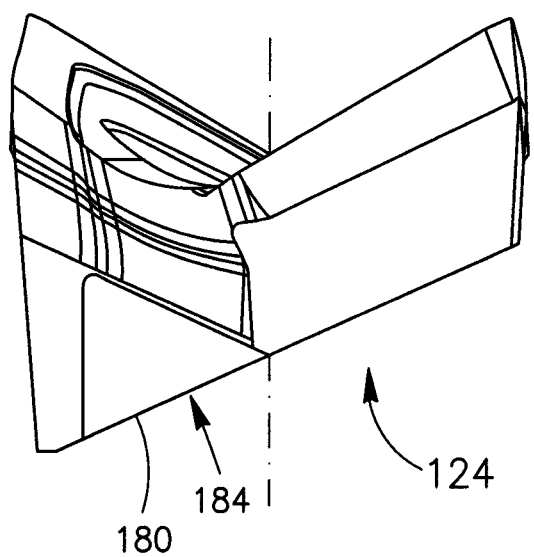
FIG. 13 is an end view of a cutting insert in accordance with a second embodiment of the present invention.

In accordance with a second embodiment of the present invention as shown in FIG. 13, the cutting insert 124 has only one base abutment plane 184 and thus, only one set of base abutment surfaces. As seen in FIG. 13, the base abutment plane 184 contains a major base abutment surface 180, it being understood that the base abutment plane 184 also contains a minor abutment surface (not shown in FIG. 13) not unlike minor abutment surface 82.

Figure 3:
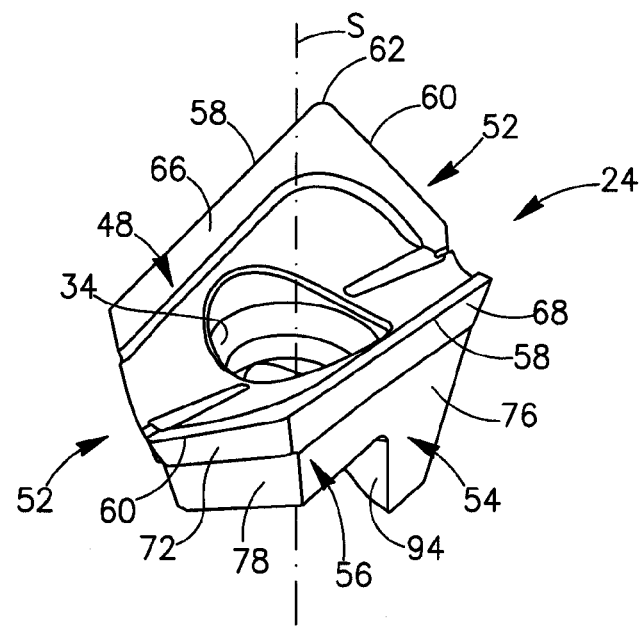
FIG. 3 is a top perspective view of the cutting insert shown in FIG. 2.
Figure 4:
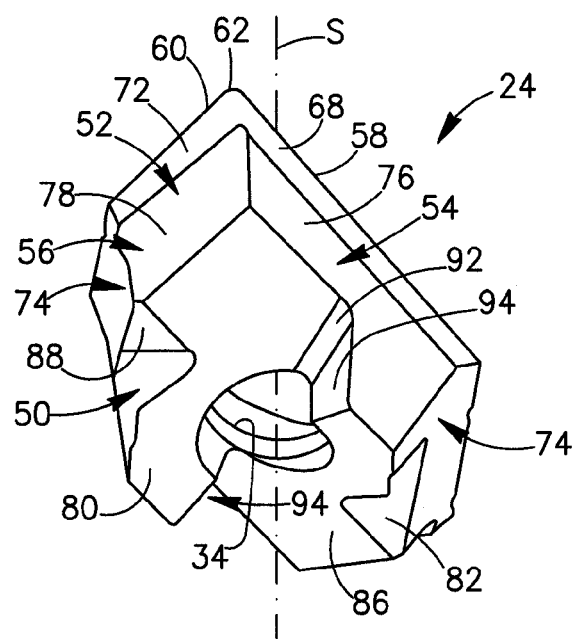
FIG. 4 is a bottom perspective view of the cutting insert shown in FIG. 2.

The lower surface 50 of the cutting insert 24 is further provided with a pair of intermediate surfaces 92 and a pair of transition surfaces 94 that join between the differently inclined first and second major base abutment surfaces 80, 86. As best seen in FIGS. 3 and 4, the transition surfaces 94 are directed transversely to the side abutment surfaces 76, and transversely to the first and second major base abutment surfaces 80, 86.

The upper surface 48 of the cutting insert 24 is provided with an optional arrangement of chip guiding means 96. Since the upper surface 48 of the cutting insert 24 does not constitute the subject matter of the present invention, it may have other configurations in other optional embodiments of the invention and will not be further discussed herein.

As seen in an end view of the cutting insert 24, the first base abutment plane 84 and the second base abutment plane 90 are slanted at a first non-zero angle α between each other. Typically, the first non-zero angle α is in the range of about 70° to 150°. According to a specific embodiment of the present invention, the first non-zero angle α is about 130°. In the present disclosure, when applied to angles, the term "about" means within a degree or so of the stated value.

Figure 9:
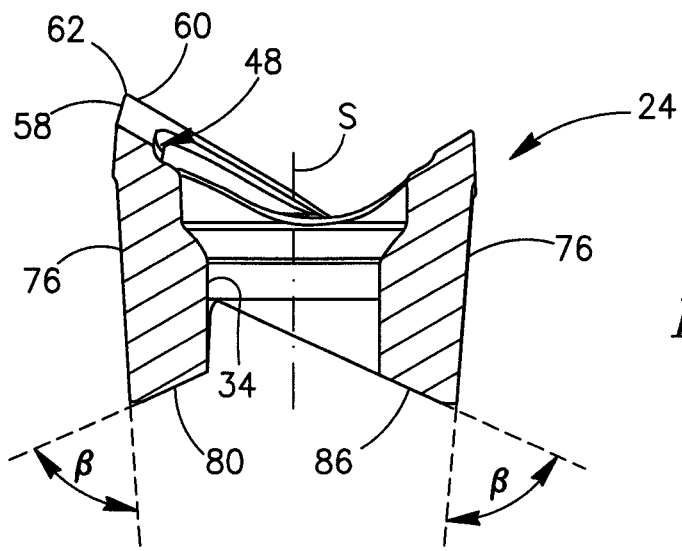
FIG. 9 is a cross-sectional view of the cutting insert taken along line IX-IX in FIG. 5.

As shown in FIG. 9, each of the side abutment surfaces 76 of the cutting insert 24 is slanted at a second non-zero angle β with respect to the associated major base abutment surface 80, 86 that lie on respective first and second base abutment planes 84, 90. Typically, the second non-zero angle β is acute and in the range of 40° to 80°. According to a specific embodiment of the present invention, the angle β is about 70°. The side support surface 38 and the inclined base support surface 42 of the tool holder 22 have corresponding respective orientations.

Figure 10:
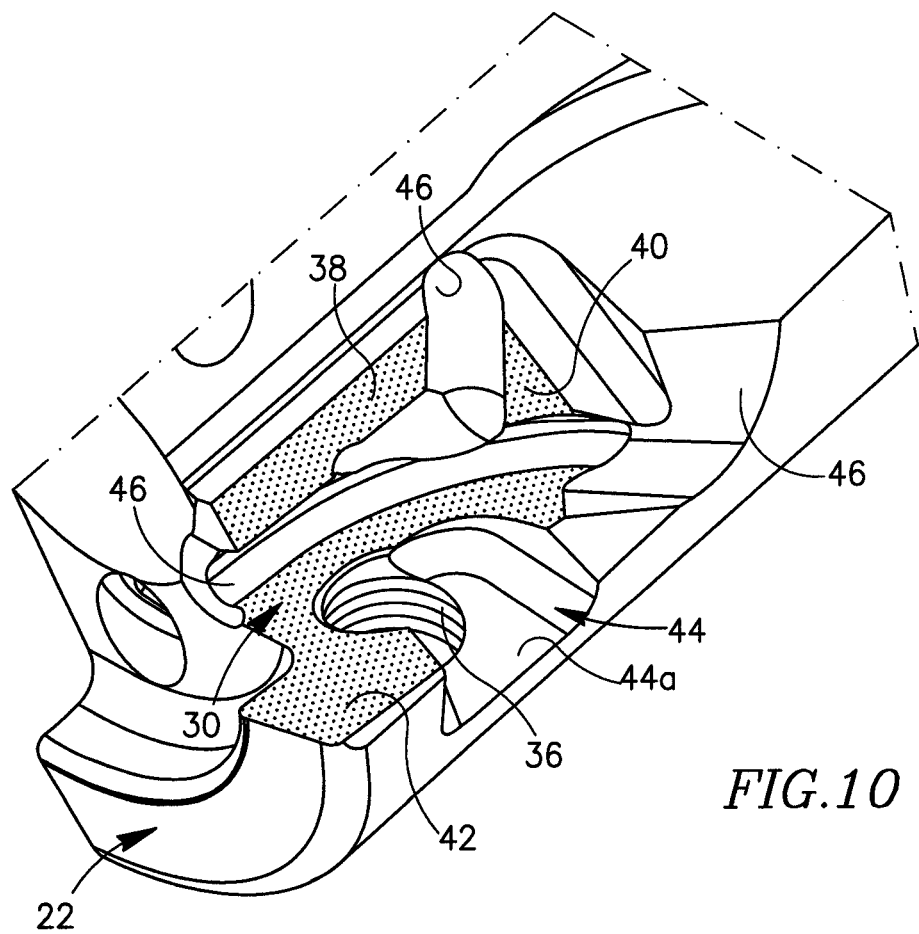
FIG. 10 is a perspective view of the pocket shown in FIG. 2.

FIG. 10 particularly visualizes the side support surface 38, the end support surface 40 and the inclined base support surface 42 that support the cutting insert 24 and the recesses 44, 46 provided in the pocket 30.

Figure 11:
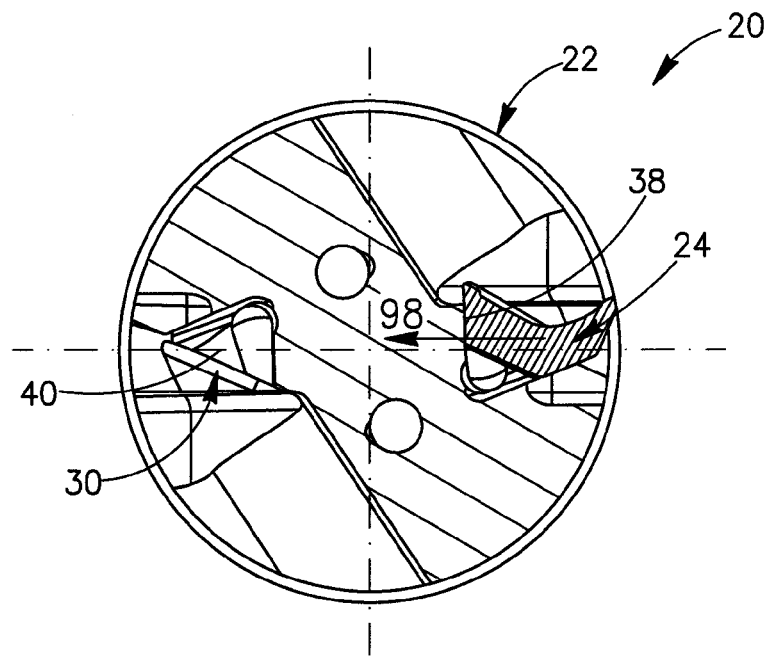
FIG. 11 is a cross-sectional view of the cutting tool taken along line XI-XI in FIG. 1.
Figure 12:
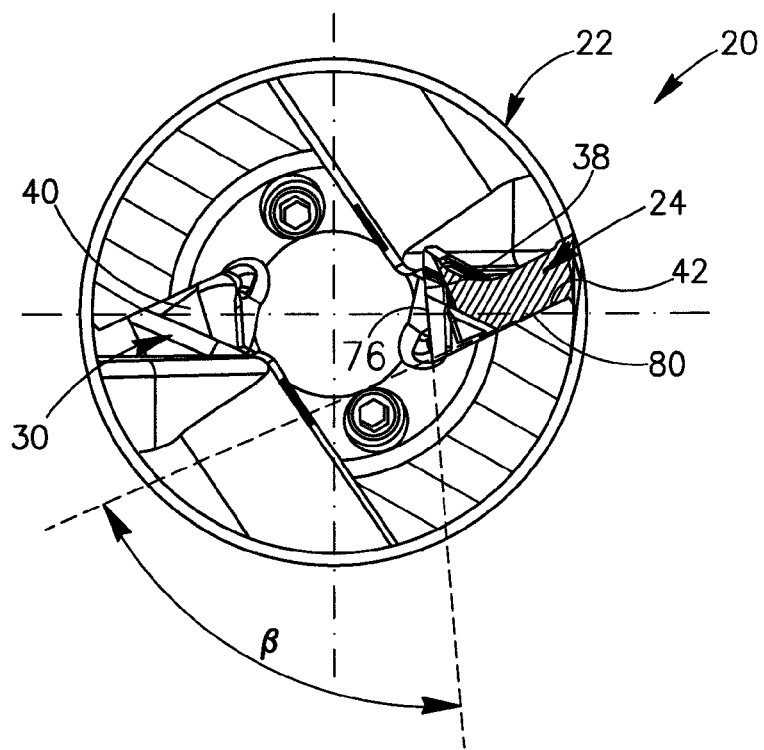
FIG. 12 is a cross-sectional view of the cutting tool taken along line XII-XII in FIG. 1.

FIGS. 11 and 12 show cross sections of the cutting tool 20 showing one pocket 30 without a cutting insert mounted therein and the cutting insert 24 releasably secured in another pocket 30. In FIG. 12 it can be seen that the side support surface 38 of the pocket 30 and the inclined base support surface 42 of the pocket 30 are slanted at the second non-zero angle β with respect to each other, in order to mate with the cutting insert 24 that has the same angle β between the side abutment surface 76 and the associated major base abutment surface 80, 86.

In view of the described above, the cutting tool 20 according to the present invention may have advantage when incorporating the following features:

First, the second non-zero angle β that is formed between the side support surface 38 of the pocket 30 and the inclined base support surface 42 of the pocket 30 creates a radially inwardly directed force component 98 (see FIG. 11) that acts on the cutting insert 24 during machining, thus decreasing the shear force acting on the clamping screw 26, especially, at very high machining speeds. Thus, the clamping screw 26 firmly clamps the cutting insert 24 and more stable operation of the cutting tool 20 is obtained.

Second, the side abutment surface 76 of the cutting insert 24 may be ground thus ensuring accurate radial positioning of the cutting insert in a relatively inexpensive and simple manner.

Third, the end abutment surface 78 of the cutting insert 24 may be ground thus ensuring accurate axial positioning of the cutting insert 24.

Fourth, the major base abutment surfaces 80, 86 and the minor base abutment surfaces 82, 88 may be ground. Since each of the major base abutment surfaces 80, 86 is coplanar with its associated minor base abutment surface 82, 88, an accurate positioning of the lower surface 50 of the cutting insert 24 is obtained.

Fifth, the location of the major base abutment surfaces 80, 86 spaced apart relative to their associated minor base abutment surfaces 82, 88 ensures firm and stable abutment of the cutting insert 24.

Thus, in view of the above, a stable and accurate positioning of the cutting insert 24 is obtained, enabling use of the cutting tool 20 for accurate machining at very high machining speeds.

If desired, the tool holder 22 may be provided with a given coolant bore 100 for supplying cooling agent directly to the operative cutting portion 64 of a given cutting insert 24. For practical production reasons, each of the coolant bores 100 is associated with a minor blind bore 102.

Although the present invention has been described to a certain degree of particularity, it should be understood that various alterations and modifications could be made without departing from the spirit or scope of the invention as hereinafter claimed.

What is claimed is:

1. A cutting insert (24) having a longitudinal axis (L) which defines a longitudinal direction and an axis of symmetry (S) around which the insert has 180° rotational symmetry, the axis of symmetry (S) being perpendicular to and intersecting, the longitudinal axis (L), the cutting insert comprising:
an upper surface (48), a lower surface (50) and a peripheral surface (56) extending between the upper surface (48) and the lower surface (50), the peripheral surface comprising a pair of side surfaces (54) paralleling the longitudinal axis (L), at least a portion of an intersection between the upper surface (48) and the peripheral surface (56) constituting a cutting edge (58, 60, 62); wherein:
the lower surface (50) comprises at least two non-coplanar major base abutment surfaces (80, 86) displaced from each other in the longitudinal direction and defining a first non-zero angle ($\alpha$) therebetween;
each of the at least two non-coplanar major base abutment surfaces (80, 86) extends on both sides of the longitudinal axis in a bottom view of the cutting insert;
each major base abutment surface (80, 86) is associated with a corresponding minor base abutment surface (82, 88);
each major base abutment surface (80,86) and its associated minor base abutment surface (82,88) are planar, are separated from one another, and lie on a same base abutment plane (84, 90); and
in an end view of the cutting insert (24), the base abutment planes (84, 90) are symmetric about a longitudinal plane (P2) defined by the intersection of the axis of symmetry (S) and the longitudinal axis (L).

2. The cutting insert (24) according to claim 1, wherein the cutting insert (24) has a through bore (34) that extends between the upper surface (48) and the lower surface (50).

3. The cutting insert (24) according to claim 1, wherein the base abutment surfaces (80, 86) have been ground.

4. The cutting insert (24) according to claim 1, wherein the cutting insert (24) is indexable.

5. The cutting insert (24) according to claim 1, wherein the first non-zero angle ($\alpha$) is in the range of about 70° to 150°.

6. The cutting insert (24) according to claim 1, wherein:
the peripheral surface (56) comprises at least a side abutment surface (76) that forms a second non-zero angle ($\beta$) with the major base abutment surface (80, 86); and
the second non-zero angle ($\beta$) is in the range of about 40° to 80°.

7. The cutting insert (24) according to claim 6, wherein the side abutment surface (76) has been ground.

8. The cutting insert (24) according to claim 6, wherein the peripheral surface (56) further comprises an end abutment surface (78), the end abutment surface (78) is generally perpendicular to the side abutment surface (76).

9. The cutting insert (24) according to claim 8, wherein the end abutment surface (78) has been ground.

10. The cutting insert (24) according to claim 1, wherein the minor base abutment surface (82, 88) has been ground.

11. The cutting insert (24) according to claim 1, wherein:
the axis of symmetry (S) extends between the upper surface (48) and the lower surface (50) of the cutting insert (24) and perpendicularly to a reference plane (P) that passes through lowermost extreme points (E1, E2) of the lower surface (50), as seen in an end view of the cutting insert (24).

12. The cutting insert (24) according to claim 11, wherein a first major base abutment surface (80) is separated from its associated first minor base abutment surface (82) by at least a second major base abutment surface (86).

13. The cutting insert (24) according to claim 1, wherein, in a top view,
the cutting insert (24) has a long dimension defined by the pair of side surfaces (54) and a short dimension defined by a pair of end surfaces (52) extending transversely to the side surfaces (54); and
the longitudinal axis (L) passes midway between the two side surfaces (54) and passes through the end surfaces (52).

14. The cutting insert (24) according to claim 1, wherein, the lower surface (50) is further provided with a pair of transition surfaces (94), each located between and directed transversely to, the non-coplanar base abutment surfaces (80, 86).

15. The cutting insert (24) according to claim 14, wherein:
the cutting insert has a through bore (34) that extends between the upper surface (48) and the lower surface (50); and
the pair of transition surfaces (94) are located on opposite sides of the through bore (34).

16. The cutting insert (24) according to claim 14, further comprising:
an intermediate surface (92) located between each transition surface (94) and a corresponding base abutment surface.

17. A cutting tool (20) comprising a tool holder (22) and at least one cutting insert (24) mounted therein and clamped by a clamping screw (26);
the cutting insert (24) having a longitudinal axis (L) which defines a longitudinal direction, the cutting insert being indexable about an axis of symmetry (S), the cutting insert comprising an upper surface (48), a lower surface (50), and a peripheral surface (56) extending between the upper surface (48) and the lower surface (50), at least a portion of an intersection between the upper surface (48) and the peripheral surface (56) constitutes a cutting edge (58, 60, 62), a through bore (34) extends between the upper surface (48) and the lower surface (50),
the lower surface (50) comprises non-coplanar first and second major base abutment surfaces (80, 86) displaced from each other in the longitudinal direction and defining a first non-zero angle ($\alpha$) therebetween,
each of the non-coplanar first and second base abutment surfaces (80, 86) extends on both sides of the longitudinal axis in a bottom view of the cutting insert,
each of the major base abutment surfaces (80, 86) is associated with a pair of side surfaces (76, 78) that join at a remote end from the associated major base abutment surface (80, 86), each pair of side surfaces comprises a side abutment surface (76) and an end abutment surface (78), the side and end abutment surfaces (76, 78) being part of the peripheral surface (56), the side abutment surface (76) is located adjacent a lower portion of the associated major base abutment surface (80, 86), and the end abutment surface (78) is located remote from the associated major base abutment surface (80, 86);
the tool holder (22) has a longitudinal axis (A) and comprises at least one pocket (30), having a threaded pocket bore (36), for retaining the cutting insert (24), the at least one pocket (30) comprises:
a generally radially directed side support surface (38), a generally axially directed end support surface (40), and an inclined base support surface (42) transversely directed to the side support surface (38) and to the end support surface (40), the inclined base support surface (42) is provided with a base recess (44) located generally in a radially outermost center region of the inclined base support surface (42);

when the cutting insert (24) is mounted in the pocket (30) and retained by the clamping screw (26) that passes through the through bore (34) and threadingly engages the threaded pocket bore (36), abutment surfaces of the cutting insert (24) abut the pocket (30) in the following manner:

a first major base abutment surface (80) of the cutting insert abuts the inclined base support surface (42) of the pocket, a side abutment surface (76) of the cutting insert abuts the side support surface (38) of the pocket, an end abutment surface (78) of the cutting insert abuts the end support surface (40) of the pocket, and a second major base abutment surface (86) of the cutting insert is located within the base recess (44) of the pocket in a non-abutted manner.

18. The cutting tool (20) according to claim 17, wherein:
in the cutting insert (24):
the lower surface (50) comprises at least two sets of abutment surfaces, each set including at least one of the major base abutment surfaces (80, 86) and at least one minor base abutment surface (82, 88);
the major and minor base abutment surfaces (80, 82) of the first set are coplanar and lie on a first base abutment plane (84); and
the major and minor base abutment surfaces (86, 88) of the second set are coplanar and lie on a second base abutment plane (90);
the major and minor base abutment surfaces (80, 82) of the first set abut the inclined base support surface (42) of the pocket; and
the major and minor base abutment surfaces (86, 88) of the second set are non-abutted.

19. A cutting tool (20) comprising a tool holder (22) and at least one cutting insert (124) mounted therein and clamped by a clamping screw (26);
the cutting insert (124) having a longitudinal axis (L) and comprising an upper surface (48), a lower surface (50) and a peripheral surface (56) extending between the upper surface (48) and the lower surface (50), at least a portion of an intersection between the upper surface (48) and the peripheral surface (56) constituting a cutting edge (58, 60, 62), a through bore (34) extends between the upper surface (48) and the lower surface (50),
the peripheral surface (56) has a side abutment surface (76) that extends generally parallel to the longitudinal axis (L), and an end abutment surface (78) that extends generally perpendicular to the longitudinal axis (L) and joins the side abutment surface (76),
the lower surface (50) has a major base abutment surface (180) which extends on both sides of the longitudinal axis (L) in a bottom view of the cutting insert, the side abutment surface (76) is located adjacent a lower portion of the major base abutment surface (180), and the end abutment surface (78) is located remote from the major base abutment surface (180);
the tool holder (22) has a longitudinal axis (A) and comprises at least one pocket (30), having a threaded pocket bore (36), for retaining the cutting insert (124), the pocket (30) comprising:
a generally radially directed side support surface (38), a generally axially directed end support surface (40), and an inclined base support surface (42) transversely directed to the side support surface (38) and to the end support surface (40), the inclined base support surface (42) is provided with a base recess (44) located generally in a radially outermost center region of the inclined base support surface (42);

when the cutting insert (124) is mounted in the pocket (30) and retained by the clamping screw (26) that passes through the through bore (34) and threadingly engages the threaded pocket bore (36), operative abutment surfaces of the cutting insert (124) abut the pocket (30) in the following manner:

the major base abutment surface (180) of the cutting insert abuts the inclined base support surface (42) of the pocket, the side abutment surface (76) of the cutting insert abuts the side support surface (38) of the pocket, and the end abutment surface (78) of the cutting insert abuts the end support surface (40) of the pocket.

20. The cutting tool (20) according to claim 19, wherein the cutting insert (124) further comprises a minor base abutment surface (82) located remote from the major base abutment surface (180), the minor base abutment surface (82) and the major base abutment surface (180) are coplanar and lie on a base abutment plane (84), and wherein when the cutting insert (124) is mounted in the pocket (30) and retained by the clamping screw (26), the major base abutment surface (180) and the minor base abutment surface (82) lie on opposite ends of the base recess (44) of the pocket (30) and abut the inclined base support surface (42) of the pocket (30).

21. A cutting insert having a longitudinal axis (L) and an axis of symmetry (S) around which the insert has 180° rotational symmetry, the axis of symmetry (S) being perpendicular to and intersecting, the longitudinal axis (L), the cutting insert comprising:
an upper surface (48);
a lower surface (50); and
a peripheral surface (56) extending between the upper surface (48) and the lower surface (50), with at least a portion of an intersection between the upper surface (48) and the peripheral surface (56) constituting a cutting edge; wherein:
the lower surface (50) comprises at least two sets of abutment surfaces, each set including at least one major base abutment surface (80, 86) and at least one minor base abutment surface (82, 88);
the major and minor base abutment surfaces of each set are spaced apart from one another by the direct interposition of at least the major base abutment surface of the other set;
the major and minor base abutment surfaces of the first set are coplanar and lie on a first base abutment plane (84);
the major and minor base abutment surfaces of the second set are coplanar and lie on a second base abutment plane (90);
the first and second base abutment planes form a first non-zero angle ($\alpha$) therebetween; and
in an end view of the cutting insert (24), the first and second base abutment planes (84, 90) are symmetric about a longitudinal plane (P2) defined by the intersection of the axis of symmetry (S) and the longitudinal axis (L).

22. The cutting insert according to claim 21, wherein:
the cutting insert (24) has a through bore (34) that extends between the upper surface (48) and the lower surface (50).

23. The cutting insert according to claim 21, wherein the peripheral surface (56) comprises:

at least one side abutment surface (76) which forms a second non-zero angle (β) with an associated base abutment plane; and at least one end abutment surface (78) which is generally perpendicular to the at least one side abutment surface (76).

24. The cutting insert according to claim 23, wherein:

the first non-zero angle (α) is in the range of about 70° to 150°; and the second non-zero angle (β) is in the range of about 40° to 80°.

25. The cutting insert according to claim 23, wherein:

the major base abutment surfaces (80, 86) have been ground;

the side abutment surface (76) has been ground; and the end abutment surface (78) has been ground.

26. The cutting insert (24) according to claim 21, wherein:

the axis of symmetry (S) extends between the upper surface (48) and the lower surface (50) of the cutting insert (24) and perpendicularly to a reference plane (P) that passes through lowermost extreme points (E1, E2) of the lower surface (50), as seen in an end view of the cutting insert (24).

27. The cutting insert (24) according to claim 21, wherein, in a top view, the cutting insert (24) has a long dimension defined by a pair of side surfaces (54) and a short dimension defined by a pair of end surfaces (52) extending transversely to the side surfaces (54); and the longitudinal axis (L) passes midway between the two side surfaces (54) and passes through the end surfaces (52).

28. The cutting insert (24) according to claim 21, wherein, the lower surface (50) is further provided with a pair of transition surfaces (94) located between and directed transversely to, the major base abutment surfaces (80, 86).

29. The cutting insert (24) according to claim 28, wherein:

the cutting insert has a through bore (34) that extends between the upper surface (48) and the lower surface (50); and the pair of transition surfaces (94) are located on opposite sides of the through bore (34).

30. The cutting insert (24) according to claim 28, further comprising:

an intermediate surface (92) located between each transition surface (94) and a corresponding major base abutment surface (80, 86).

31. A rotary cutting tool (20) comprising:

a tool holder (22) having a longitudinal axis (A) and at least one pocket (30), the at least one pocket comprising:

a generally radially directed side support surface (38);

a generally axially directed end support surface (40); and an inclined base support surface (42) transversely directed to the side support surface (38) and to the end support surface (40), the inclined base support surface (42) being provided with a base recess (44) located generally in a radially outermost center region of the inclined base support surface (42); and a threaded pocket bore (36); and a cutting insert (24) having a longitudinal axis (L) and comprising:

an upper surface (48);

a lower surface (50); and a peripheral surface (56) extending between the upper surface (48) and the lower surface (50), with at least a portion of an intersection between the upper surface (48) and the peripheral surface (56) constituting a cutting edge; wherein:

the lower surface (50) comprises at least two sets of abutment surfaces, each set including at least one major base abutment surface (80, 86) and at least one minor base abutment surface (82, 88);

the major and minor base abutment surfaces of each set are spaced apart from one another by at least the major base abutment surface of the other set;

the major and minor base abutment surfaces of the first set are coplanar and lie on a first base abutment plane (84);

the major and minor base abutment surfaces of the second set are coplanar and lie on a second base abutment plane (90); and the first and second base abutment planes form a first non-zero angle (α) therebetween; wherein:

the cutting insert is mounted in the tool holder pocket (30) and retained by a clamping screw (26) passing through the insert and threadingly engaging the threaded pocket bore (36);

the major and minor base abutment surfaces of a first set of abutment surfaces abut the inclined base support surface (42);

at least a portion of the major base abutment surface of the second set of abutment surfaces is located within the base recess (44) of the pocket in a non-abutted manner; and one of the side abutment surfaces (76) abuts the side support surface (38) of the pocket.

32. The cutting tool (20) according to claim 31, wherein:

the major and minor base abutment surfaces (86, 88) of the second set are non-abutted.

* * * * *